United States Patent [19]
Londrigan et al.

[11] Patent Number: 5,308,883
[45] Date of Patent: May 3, 1994

[54] CATALYST FOR POLYISOCYANURATE FOAMS MADE WITH ALTERNATIVE BLOWING AGENTS

[75] Inventors: Michael E. Londrigan, Clearwater; Kenneth G. Trout, Tampa, both of Fla.

[73] Assignee: The Celotex Corporation, Tampa, Fla.

[21] Appl. No.: 62,914

[22] Filed: May 18, 1993

Related U.S. Application Data

[63] Continuation-in-part of Ser. No. 971,105, Nov. 4, 1992, abandoned.

[51] Int. Cl.$^5$ .................................................. C08J 9/00
[52] U.S. Cl. ................................... 521/125; 521/128; 521/129; 521/901
[58] Field of Search ................ 521/125, 128, 129, 901

[56] References Cited

U.S. PATENT DOCUMENTS

| | | | |
|---|---|---|---|
| 3,954,684 | 5/1976 | Farrissey et al. | 260/2.5 |
| 4,136,240 | 1/1979 | Zimmerman et al. | 521/115 |
| 4,426,461 | 1/1984 | Smith | 521/116 |
| 4,459,334 | 7/1984 | Blanpied et al. | 428/219 |
| 4,710,521 | 12/1987 | Soukup et al. | 521/118 |
| 4,760,100 | 7/1988 | McDaniel | 521/137 |

OTHER PUBLICATIONS

Ricci, R. L. and Van Der Heijden, B., "Polyurethane & Polyisocyanurate Rigid Boardstock Technologies", Polyurethanes World Congress, Sep. 29–Oct. 2, 1987, pp. 266–269.

*Primary Examiner*—Morton Foelak
*Attorney, Agent, or Firm*—Charles W. Vanecek

[57] ABSTRACT

Rigid, closed cell polyisocyanurate foams are prepared by reacting together a polyisocyanate and a polyester polyol or a mixture of a polyester polyol and at least one other isocyanate-reactive compound in the presence of (a) a hydrogen-containing blowing agent or a mixture of a hydrogen-containing blowing agent and at least one co-blowing agent and (b) a catalyst mixture comprising (i) a carboxylate salt of an alkali metal or an alkaline earth metal or mixtures thereof, (ii) a tertiary amine, and (iii) a quaternary ammonium carboxylate salt, wherein the equivalent ratio of carboxylate metal salt: tertiary amine is a value less than about 3:1, and the quaternary ammonium carboxylate salt is present in an amount which enhances the char structure of polyisocyanurate foams made with the catalyst mixture and subjected to flammability char tests.

23 Claims, 1 Drawing Sheet

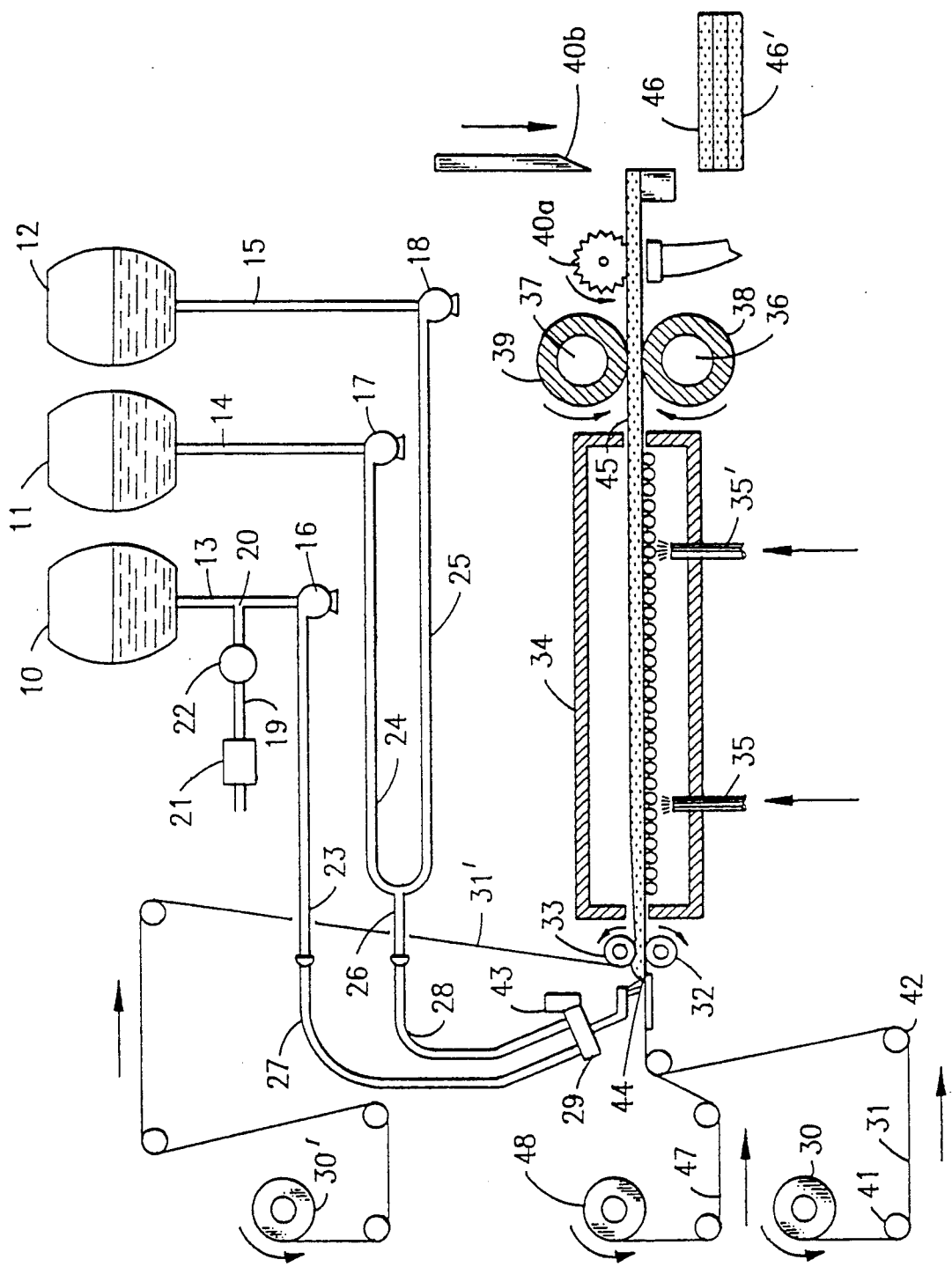

5,308,883

CATALYST FOR POLYISOCYANURATE FOAMS MADE WITH ALTERNATIVE BLOWING AGENTS

This is a continuation-in-part of Application Ser. No. 971,105, filed Nov. 4, 1992 abandoned.

BACKGROUND OF THE INVENTION

1. Field of the Invention

This invention relates to the preparation of high temperature resistant, insulating polyisocyanurate foams and is more particularly concerned with a novel catalyst combination for the preparation of such foams from compositions containing polyester polyols and blowing agents used to replace the conventional fully halogenated chlorofluorocarbons.

2. Description of the Prior Art

It is well known in the manufacture of rigid polyurethane and polyisocyanurate foams to employ chlorofluorocarbons, such as trichlorofluoromethane, as the blowing agent. These chlorofluorocarbon compounds boil or exhibit a significant vapor pressure at ambient temperatures and are volatilized during the exothermic reaction of an isocyanate with an active hydrogencontaining compound, such as a polyol. The expanding gas is entrapped within the reaction mixture and forms an insulating cellular structure. While the foam industry has had good results using the conventional chlorofluorocarbon blowing agents, such as CFC-11, the agents have come under attack in recent years on the ground that they are believed to give rise to environmental problems concerned with ozone depletion in the stratosphere. Accordingly, the search is ongoing for alternative blowing agents with a low ozone depletion factor to replace the conventional ones.

It is believed that hydrogenated CFC's (also known as HCFC's), which are partially halo-substituted hydrocarbons, present less risk than the CFC's. Because the HCFC's contain one or more hydrogen atoms, they more readily dissociate under conditions encountered in the atmosphere, and therefore, less of them would reach the ozone layer of the stratosphere in a form which could cause significant damage. Accordingly, the hydrogen-containing halocarbons have been investigated as possible alternatives for CFC-11 in rigid foam applications.

The search for acceptable alternative blowing agents among hydrogenated CFC's is difficult because of the combination of performance characteristics required of them. The agents must not impart unacceptable fire or toxicological risks in the foaming operation or to the finished foam products. In this regard, it is desirable for polyisocyanurate foams to develop a thick protective char under fire exposure, but it is found that the char shrinkage for foams made with HCFC's is greater than for identical polymer compositions blown with CFC-11. The agents further must not react with the other components of the foam formulation and should be adequately soluble in the foam system. Also, their boiling point, vapor thermal conductivity, capacity to efficiently produce gas and diffusion rate must be appropriate for the formation of highly insulating foams. Finally, the alternative blowing agents should be reasonable in cost.

There still remains a need for a rigid polyisocyanurate foam which has superior properties even though the conventional CFC blowing agents are avoided in its production.

OBJECTS OF THE INVENTION

It is therefore an object of the present invention to provide an improved polyisocyanurate foam from a foam-forming composition which contains both a polyester polyol and a blowing agent having reduced ozone depletion potential.

It is another object of the present invention to produce an improved rigid polyisocyanurate foam material having a combination of advantageous properties, including a high degree of fire resistance with low smoke evolution and flame spread on combustion.

It is still another object of the present invention to provide a catalyst blend for the production, from a foam-forming composition containing a polyester polyol and an alternative blowing agent, of a polyisocyanurate foam having a combination of desirable properties, including an appropriate reactivity profile, a reduced friability, good dimensional stability, and high thermal stability, insulation value and compressive strength.

It is a further object of the present invention to provide a catalyst blend whose use in the production of polyisocyanurate foam contributes to char integrity and minimum char shrinkage when the resultant foam is exposed to fire.

It is a still further object of the present invention to provide closed cell polyisocyanurate foam materials which can be used in building panels which are highly insulating, thermally resistant, soundproof and self-supporting.

BRIEF DESCRIPTION OF DRAWING

The invention will now be described with reference to the accompanying drawing which is a side schematic representation of an apparatus suitable for producing a polyisocyanurate form material in accordance with the present invention.

SUMMARY OF THE INVENTION

The above objects have been achieved through the use of a particular combination of catalysts for the formation of a rigid polyisocyanurate foam. The catalyst mixture of the invention comprises a tertiary amine, a metal salt of an organic acid and a quaternary ammonium carboxylate salt. The proportion of organic acid metal salt to tertiary amine in the catalyst blend is advantageously less than that conventionally used for the preparation of rigid polyisocyanurate foams. It has been found that the use of this catalyst mixture of the invention results in closed cell polyisocyanurate foam materials characterized by outstanding properties, including an appropriate reactivity profile, low friability, good dimensional stability, low flammability, and low thermal conductivity. The catalyst mixture is especially effective through its contribution to the formation of a protective char when the foam is subjected to combustion.

The improved polyisocyanurate foam of the invention is prepared from reactants comprising a polyisocyanate and a polyester polyol, preferably an aromatic polyester polyol, which are brought together in the presence of the catalyst mixture and at least one hydrogen atom-containing blowing agent, preferably a hydrogen-containing halocarbon, such as HCFC-141b (1,1,1-dichlorofluoroethane). The foaming reaction may be carried out in the presence of auxiliaries and additives as required (e.g., a surfactant).

The polyisocyanate component employed in the preparation of the cellular polymers of the invention can be any of the polyisocyanates known to be useful in the art of polymer formation. A preferred group of polyisocyanates are the aromatic polyisocyanates, especially methylene-bridged polyphenyl polyisocyanate mixtures.

The polyisocyanate is reacted with a polyol component which comprises a polyester polyol or a mixture of a polyester polyol with at least one other isocyanate-reactive compound, such as a polyether polyol. The relative proportions of reactive components are generally such that the equivalent ratio of isocyanate groups to isocyanate reactive groups (e.g., hydroxy groups) is at least about 1.2:1, preferably at least about 2:1. In a preferred embodiment of the invention, the polyol component comprises 50 to 100%, by weight, of a polyester polyol, preferably an aromatic polyester polyol. Especially preferred are the crude polyester polyols obtained by the transesterification of crude reaction residues or scrap polyester resins, as disclosed in U.S. Pat. No. 4,996,242, which disclosure relative thereto is incorporated herein by reference.

DETAILED DESCRIPTION OF THE INVENTION

The high temperature and fire resistant polyisocyanurate cellular polymers of the present invention are prepared through the use of a novel catalyst combination of an organic acid metal salt, a tertiary amine, and a quaternary ammonium carboxylate salt wherein the organic acid metal salt: tertiary amine ratio is lower than the ratio of these two catalyst components which is conventionally used for the formation of rigid polyisocyanurate foams. Through this catalyst combination, it has been found that the fire performance of polyisocyanurate foams blown with blowing agents whose flammability exceeds that of CFC-11 is improved, whereby minimal char shrinkage occurs and char integrity is maintained upon exposure of the foams to combustion.

The organic acid metal salt of the catalyst mixture suitably is an alkali metal and/or alkaline earth metal salt(s) of a carboxylic acid, such as one containing from about 1 to 30 carbon atoms. The cation of the organic acid metal salt, which is preferably an alkali metal salt(s), advantageously is K or Na, more preferably K. Particularly preferred are $C_1$-$C_8$, carboxylate salts, including the sodium and potassium salts of formic, acetic, propionic and 2-ethylhexanoic acids.

The tertiary amines which can be employed in the catalyst system in accordance with the invention are those which are more usually employed to catalyze the reaction between an isocyanato group and an active hydrogen atom. Such catalysts are a group of compounds well recognized in the art of synthesizing polyurethanes; see, for example, Saunders et al., Polyurethanes, Chemistry and Technology, Part I, pages 228-230, Interscience Publishers, New York, 1964; see also Burkus, J., Journal of Organic Chemistry, 26, pages 779-782, 1961.

Representative of said tertiary amine catalysts are: N,N-dialkylpiperazines such as N,N-dimethylpiperazine, N,N-diethylpiperazine and the like; trialkylamines such as trimethylamine, triethylamine, tributylamine and the like; 1,4-diazabicyclo[2.2.2]octane, which is more frequently referred to as triethylene diamine, and the lower-alkyl derivatives thereof such as 2-methyl triethylene diamine, 2,3-dimethyl triethylene diamine, 2,5-diethyl triethylene diamine and 2,6-diisopropyl triethylene diamine; N,N',N''-trialkylaminoalkyl-hexahydrotriazines such as N,N',N''-tris-(dimethylaminomethyl)-hexahydrotriazine, N,N',N''tris-(dimethylaminoethyl)hexahydrotriazine and the like; mono-, di-, and tri-(dialkylaminoalkyl) monohydric phenols or thiophenols such as 2-(dimethylaminomethyl)phenol, 2-(dimethylaminobutyl)phenol and the like; N,N,N',N'-tetraalkylalkylenediamines such as N,N,N',N'-tetramethyl-1,3-propane diamine, N,N,N',N'-tetramethyl-1,3-butanediamine, N,N,N',N'-tetramethylethylenediamine and the like; N,N-dialkylcyclohexylamines such as N,N-dimethylcyclohexylamine, N,N-diethylcyclohexylamine and the like; N-alkylmorpholines such as N-methylmorpholine, N-ethylmorpholine and the like; N,N-dialkylalkanolamines such as N,N-dimethylethanolamine, N,N-diethylethanolamine and the like; N,N,N'N'-tetraalkylguanidines such as N,N,N',N,-tetramethylguanidine, N,N,N',N'-tetraethylguanidine and the like. The tertiary amine catalysts can be employed singly or in combination of two or more such amines.

The preferred tertiary aminophenol of the catalyst mixture contains one or more tertiary amino groups and one or more phenolic hydroxyl groups. A tertiary amino group contained by the tertiary aminophenol may be any tertiary amino group; for example, it can be the group:

wherein $R_1$ and $R_2$ are alike or unlike, and are each an aliphatic, cycloaliphatic, aryl, heterocyclic, aliphaticcycloaliphatic, aliphatic-aryl, aliphaticheterocyclic, cycloaliphatic-aliphatic, cycloaliphatic-aryl, cycloaliphatic-heterocyclic, aryl aliphatic, aryl cycloaliphatic, aryl heterocyclic, heterocyclic aliphatic, heterocycliccycloaliphatic or heterocyclic aryl group; or $R^1$ and $R_2$ are joined to form an alkylene chain that can be interrupted by a heterocyclic atom. Preferred tertiary amino groups are obtained when $R_1$ and $R_2$ are each an alkyl, cycloalkyl, phenyl, naphthyl, piperid-4-yl, alkyl cycloalkyl, alkyl phenyl, alkyl naphthyl, 1-alkyl-4-piperidyl, cycloalkyl alkyl, cycloalkyl phenyl, cycloalkyl naphthyl, 1-cycloalkyl-3-pyrrolidinyl, phenyl alkyl, naphthyl alkyl, phenyl cycloalkyl, 1-phenyl-4-piperidyl, pyrid-4-yl alkyl, pyrrolidin-3-yl cyclohexyl, morpholin-3-yl phenyl, morpholino, pyrrolidino or piperidino group. Particularly preferred tertiary amino groups are obtained when $R_1$ and $R_2$ are each an alkyl group containing 1 to 8 carbon atoms. If desired, the tertiary amino groups can be joined to the phenolic residue by an alkylene group, preferably an alkylene group containing 1 to 8 carbon atoms.

Some examples of tertiary aminophenols containing one or more tertiary amino groups and one or more phenolic hydroxyl groups are: 1-hydroxy-2-dialkylamino-4,5-dialkylbenzenes such as 1-hydroxy-2-diethylamino-4,5-dimethylbenzene; 1-hydroxy-2-dialkylamino naphthalenes such as 1-hydroxy-2-dimethylamino naphthalene; 1-hydroxy-2,4-bis(dialkylamino)benzenes such as 1-hydroxy-2,4-bis(diethylamino)benzene; 1-hydroxy-2-dialkylaminoalkyl benzenes such as 1-hydroxy-2-dimethylaminoethyl benzene; 1,2-dihydroxy-3-dialkylaminoalkyl benzenes such as 1,2-dihydroxy 3-dimethylaminomethyl benzene; and 1,2,3-trihydroxy-5-dialkylaminoalkyl benzenes such as 1,2,3-trihydroxy-5-dimethylaminomethyl benzene.

Preferred tertiary aminophenols have the general formula:

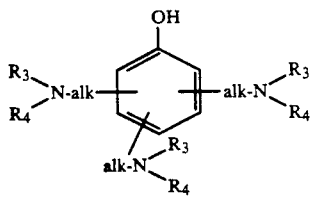

wherein alk is an alkylene group; and $R_3$ and $R_4$ are similar or dissimilar and are each an alkyl group. Particularly preferred tertiary aminophenols are 2,4,6-tris(-dialkylaminoalkyl)phenols, especially those wherein the alkyl groups have 1 to 8 carbon atoms; as, for example, 2,4,6-tris(dimethylaminomethyl)phenol, 2,4,6-tris(diethylaminomethyl)phenol, and 2,4,6-tris(N-methyl-N-ethylaminoethyl)phenol.

Other preferred tertiary amine catalysts for use in preparing polyisocyanurate foams of the invention are the triethylene diamines and the N,N'N''-tris(dialkylaminoalkyl) hexahydrotriazines.

The equivalent ratio of the organic acid metal salt to the tertiary amine is chosen to optimize the fire performance of the polyisocyanurate foams. The weight loss and volume shrinkage experienced by foams subjected to flammability char tests when the high metal salt: tertiary amine equivalent ratios of the prior art are employed can be significantly lessened by lowering this ratio. The appropriate ratio for any given metal salt/tertiary amine combination and foam-forming mixture can be readily determined through routine experimentation. Generally, the equivalent ratio of the organic acid metal salt to the tertiary amine in the inventive mixture is less than about 3:1, preferably less than about 2.5:1, and more preferably less than about 2:1. In a particularly desirable embodiment of the invention, the metal salt: tertiary amine equivalent ratio is about 1.5-1:1 (e.g., 1:1).

The catalyst mixture of the invention includes a quaternary ammonium carboxylate salt, which enhances the char structure of burnt foams made with the mixture. This salt preferably is made from a lower-alkanoic acid containing from 1 to 8 carbon atoms, inclusive, such as formic, acetic, propionic, butyric, pentanoic, hexanoic, heptanoic, octanoic, and isomers thereof. The quaternary substituents may be independently selected from the group consisting of lower-alkyl, substituted-lower-alkyl (e.g., hydroxy- or halo-lower-alkyl), and aralkyl. Quaternary salt components of the catalyst mixture and their preparation are described in U.S. Pat. No. 3,954,684, which disclosure is incorporated herein by reference.

The three component catalyst mixture is suitably employed in the form of an anhydrous solution in a polar hydroxylic organic solvent. The solvent is preferably a polyol, which desirably is an alkylene diol or polyalkylene ether diol, e.g., diethylene glycol. It is generally desirable to dissolve the catalyst components in about the minimum solvent needed to dissolve the metal-based component, which is the more difficultly dissolvable component.

The equivalent ratio of organic acid metal salt: tertiary amine:quaternary ammonium salt for optimum practice of the invention is readily determinable. The preferred ratios are those whose use gives rise to reduced foam weight loss, reduced % volume loss and increased char densification when the foam is subjected to fire testing, such as in accordance with the Factory Mutual BUR Calorimeter test. The use of the organic acid metal salt/tertiary amine mixture in the unconventional lower ratio discussed above in combination with the quaternary ammonium salt improves considerably the fire performance of the inventive polyisocyanurate foams made with alternate blowing agents. The equivalents of quaternary ammonium salt(s) are advantageously less than the total equivalents of organic acid metal salt(s) and tertiary amine(s).

The catalyst mixtures of the invention are used in a catalytically effective amount. Generally, the catalyst mixture comprises from about 0.1 to 20 and preferably from about 0.3 to 10 weight percent of the total foam-forming composition.

The polyisocyanurate foams of the present invention can be prepared by using standard techniques known to those skilled in the art. These foams can be simply prepared by polymerizing and foaming the organic polyisocyanate with the polyol in the presence of the catalyst mixture, blowing agent and other additives, such as a surfactant and the like, as necessary, at a suitable temperature, such as from about 0° C. to 150° C. The quantities of reactants are such that the ratio of isocyanate (NCO) groups to hydroxyl (OH) groups is generally from 1.2:1 to 10:1 or higher. This NCO:OH ratio is preferably at least about 1.5:1, more preferably at least about 3:1, and most preferably at least about 4:1.

The polyisocyanate component employed in the foam preparation can be any of the polyisocyanates known to be useful in the art of polymer formation. The organic di-or polyisocyanates of the invention include aliphatic, cycloaliphatic, araliphatic, aromatic and heterocyclic polyisocyanates and combinations thereof characterized in having two or more isocyanate (NCO) groups per molecule.

Among the many isocyanates suitable for the practice of the subject invention are, for example, tetramethylene, hexamethylene, octamethylene and decamethylene diisocyanates, and their alkyl substituted homologs, 1,2-, 1,3-and 1,4-cyclohexane diisocyanates, 2,4- and 2,6-methyl-cyclohexane diisocyanates, 4,4'- and 2,4'-dicyclohexyldiisocyanates, 4,4'- and 2.4'-dicyclohexylmethane diisocyanates, 1,3,5-cyclohexane triisocyanates, saturated (hydrogenated) polymethylenepolyphenylenepolyisocyanates, isocyanatomethylcyclohexane isocyanates, isocyanatoethylcyclohexane isocyanates, bis(isocyanatomethyl)-cyclohexane diisocyanates, 4,4'- and 2,4'-bis(isocyanatomethyl) dicyclohexane, isophorone diisocyanate, 1,2-, 1,3-, and 1,4-phenylene diisocyanates, 2,4- and 2,6-toluene diisocyanate, 2,4'-, 4,4'- and 2,2-biphenyl diisocyanates, 2,2'-, 2,4'- and 4,4'- diphenylmethane diisocyanates, polymethylenepolyphenylene-polyisocyanates (polymeric MDI), and aromatic aliphatic isocyanates such as 1,2-, 1,3-, and 1,4-xylylene diisocyanates.

Organic isocyanates containing heteroatoms may also be utilized, for example those derived from melamine. Modified polyisocyanates, such as carbodiimide or isocyanurate can also be employed. Liquid carbodiimide group- and/or isocyanurate ring-containing polyisocyanates having isocyanate contents from 15 to 33.6 percent by weight, preferably from 21 to 31 percent by weight, are also effective, for example, those based on 4,4'-, 2,4'-, and/or 2,2'-diphenylmethane diisocyanate and/or 2,4- and/or 2,6-toluene diisocyanate, and preferably 2,4- and 2,6-toluene diisocyanate and the corresponding isomer mixtures, 4,4'-, 2,4', and 2,2'-diphenylmethane diisocyanates as well as the corresponding isomer mixtures, for example, mixtures of 4,4'- and 2,4'-diphenylmethane diisocyanates, mixtures of diphenylmethane diisocyanates and polyphenyl polymethylene polyisocyanates (polymeric MDI), and mixtures of toluene diisocyanates and polymeric MDI. Preferred, however, are the aromatic diisocyanates diisocyanates and polyisocyanates. Particularly preferred are 2,4-, and 2,6-toluene diisocyanate and mixtures thereof (TDI), 2,4'-, 2,2'- and 4,4'-diphenylmethane diisocyanate (MDI), polymethylenepolyphenylenepolyisocyanates (polymeric MDI), and mixtures of the above preferred isocyanates.

Most particularly preferred are the polymeric MDI's.

Still other useful organic polyisocyanates are isocyanate terminated quasi-prepolymers. These quasi-prepolymers are prepared by reacting excess organic polyisocyanate or mixtures thereof with a minor amount of an active hydrogen-containing compound. Suitable active hydrogen containing compounds for preparing the quasi-prepolymers hereof are those containing at least two active hydrogen-containing groups which are isocyanate reactive. Typifying such compounds are hydroxyl-containing polyesters, polyalkylene ether polyols, hydroxyl-terminated polyurethane oligomers, polyhydric polythioethers, ethylene oxide adducts of phosphorous-containing acids, polyacetals, aliphatic polyols, aliphatic thiols including alkane, alkene and alkyne thiols having two or more SH groups; as well as mixtures thereof. Compounds which contain two or more different groups within the above-defined classes may also be used such as, for example, compounds which contain both an SH group and an OH group. Highly useful quasi-prepolymers are disclosed in U.S. Pat. No. 4,791,148 and U.S. application Ser. No. 07/342,508, filed Apr. 24, 1989, the disclosures of which with respect to the quasi-prepolymers are hereby incorporated by reference.

The polyester polyols of the invention can be prepared by known procedures from a polycarboxylic acid component comprising a polycarboxylic acid or acid derivative, such as an anhydride or ester of the polycarboxylic acid, and any polyol component. The polyol component advantageously comprises a glycol(s) or a glycol-containing mixture of polyols. The polyacid and/or polyol components may, of course, be used as mixtures of two or more compounds in the preparation of the polyester polyols. Particularly suitable polyester polyols for use in the foam production are aromatic polyester polyols containing phthalic acid residues.

The production of the polyester polyols is accomplished by simply reacting the polycarboxylic acid or acid derivative with the polyol component in a known manner until the hydroxyl and acid values of the reaction mixture fall in the desired range.

After transesterification or esterification, the reaction product can be reacted with an alkylene oxide to form a polyester polyol mixture of the invention. This reaction desirably is catalyzed. The temperature of this process should be from about 80° to 170° C., and the pressure should generally range from about 1 to 40 atmospheres.

The polycarboxylic acid component may be aliphatic, cycloaliphatic, aromatic and/or heterocyclic and may optionally be substituted, for example, by halogen atoms, and/or may be unsaturated. Examples of suitable carboxylic acids and derivatives thereof for the preparation of the polyester polyols include: oxalic acid; malonic acid; succinic acid; glutaric acid; adipic acid; pimelic acid; suberic acid; azelaic acid; sebacic acid; phthalic acid; isophthalic acid; trimellitic acid; terephthalic acid; phthalic acid anhydride; tetrahydrophthalic acid anhydride; pyromellitic dianhydride; hexahydrophthalic acid anhydride; tetrachlorophthalic acid anhydride; endomethylene tetrahydrophthalic acid anhydride; glutaric acid anhydride; maleic acid; maleic acid anhydride; fumaric acid; dibasic and tribasic unsaturated fatty acids optionally mixed with monobasic unsaturated fatty acids, such as oleic acid; terephthalic acid dimethyl ester and terephthalic acid-bis glycol ester.

Polyester polyols whose acid component advantageously comprises at least about 30% by weight of phthalic acid residues are particularly useful. By phthalic acid residue is meant the group

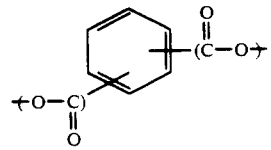

While the aromatic polyester polyols can be prepared from substantially pure reactant materials, more complex ingredients are advantageously used, such as the sidestream, waste or scrap residues from the manufacture of phthalic acid, terephthalic acid, dimethyl terephthalate, polyethylene terephthalate, and the like. Particularly suitable compositions containing phthalic acid residues for use in the invention are (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f) residues from the manufacture of terephthalic acid, (g) isophthalic acid and (h) trimellitic anhydride, and (i) combinations thereof. These compositions may be converted by reaction with the polyols of the invention to polyester polyols through conventional transesterification or esterification procedures.

A preferred polycarboxylic acid component for use in the preparation of the aromatic polyester polyols is phthalic anhydride. This component can be replaced by phthalic acid or a phthalic anhydride bottoms composition, a phthalic anhydride crude composition, or a phthalic anhydride light ends composition, as such compositions are defined in U.S. Pat. No. 4,529,744.

Other preferred materials containing phthalic acid residues are polyalkylene terephthalates, especially polyethylene terephthalate (PET), residues or scraps.

Still other preferred residues are DMT process residues, which are waste or scrap residues from the manufacture of dimethyl terephthalate (DMT). The term "DMT process residue" refers to the purged residue which is obtained during the manufacture of DMT in which p-xylene is converted through oxidation and esterification with methanol to the desired product in a reaction mixture along with a complex mixture of by-products. The desired DMT and the volatile methyl p-toluate by-product are removed from the reaction mixture by distillation leaving a residue. The DMT and methyl p-toluate are separated, the DMT is recovered and methyl p-toluate is recycled for oxidation. The residue which remains can be directly purged from the process or a portion of the residue can be recycled for oxidation and the remainder diverted from the process, or, if desired, the residue can be processed further, as, for example, by distillation, heat treatment and/or methanolysis to recover useful constituents which might otherwise be lost, prior to purging the residue from the system. The residue which is finally purged from the process, either with or without additional processing, is herein called DMT process residue.

These DMT process residues may contain DMT, substituted benzenes, polycarbomethoxy diphenyls, benzyl esters of the toluate family, dicarbomethoxy fluorenone, carbomethoxy benzocoumarins and carbomethoxy polyphenols. Cape Industries, Inc. sells DMT process residues under the trademark Terate ®101. DMT process residues having a different composition but still containing the aromatic esters and acids are also sold by DuPont and others. The DMT process residues to be transesterified in accordance with the present invention preferably have a functionality at least slightly greater than 2.

Such suitable residues include those disclosed in U.S. Pat. Nos. 3,647,759, 4,411,949, 4,714,717, and 4,897,429, the disclosures of which with respect to the residues are hereby incorporated by reference.

The polyester polyols are prepared from the above described polycarboxylic acid components and any polyol component. The polyols can be aliphatic, cycloaliphatic, aromatic and/or heterocyclic. Low molecular weight aliphatic polyhydric alcohols, such as aliphatic dihydric alcohols having no more than about 20 carbon atoms are highly satisfactory. The polyols optionally may include substituents which are inert in the reaction, for example, chlorine and bromine substituents, and/or may be unsaturated. Suitable amino alcohols, such as, for example, monoethanolamine, diethanolamine, triethanolamine, or the like may also be used. Moreover, the polycarboxylic acid(s) may be condensed with a mixture of polyhydric alcohols and amino alcohols.

A preferred polyol component is a glycol. The glycols may contain heteroatoms (e.g., thiodiglycol) or may be composed solely of carbon, hydrogen, and oxygen. They are advantageously simple glycols of the general formula $C_nH_{2n}(OH)_2$ or polyglycols distinguished by intervening ether linkages in the hydrocarbon chain, as represented by the general formula $C_nH_{2n}O_x(OH)_2$. In a preferred embodiment of the invention, the glycol is a low molecular weight aliphatic diol of the generic formula:

HO—R—OH wherein R is a divalent radical selected from the group consisting of:
  (a) alkylene radicals each containing from 2 through 6 carbon atoms, and
  (b) radicals of the formula:

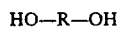
—(R$^1$O)$_m$—R$^1$— wherein R$^1$ is an alkylene radical containing from 2 through 6 carbon atoms, and m is an integer of from 1 through 4, and
  (c) mixtures thereof.

Examples of suitable polyhydric alcohols include: ethylene glycol; propylene glycol-(1,2) and -(1,3); butylene glycol-(1,4) and -(2,3); hexane diol-(1,6); octane diol-(1,8); neopentyl glycol; 1,4-bishydroxymethyl cyclohexane; 2-methyl-1,3-propane diol; glycerin; trimethylolpropane; trimethylolethane; hexane triol-(1,2,6); butane triol-(1,2,4); pentaerythritol; quinol; mannitol; sorbitol; methyl glucoside; diethylene glycol; triethylene glycol; tetraethylene glycol and higher polyethylene glycols; dipropylene glycol and higher polypropylene glycols as well as dibutylene glycol and higher polybutylene glycols. Especially suitable polyols are alkylene glycols and oxyalkylene glycols, such as ethylene glycol, diethylene glycol, dipropylene glycol, triethylene glycol, tripropylene glycol, tetraethylene glycol, tetrapropylene glycol, trimethylene glycol and tetramethylene glycol, and 1,4-cyclohexanedimethanol (1,4-bis-hydroxymethylcyclohexane).

The term "polyester polyol" as used in this specification and claims includes any minor amounts of unreacted polyol remaining after the preparation of the polyester polyol and/or unesterified polyol (e.g., glycol) added after the preparation. The polyester polyol can advantageously include up to about 40 weight percent free glycol.

The polyester polyols advantageously have an average functionality of about 1.8 to 8, preferably about 1.8 to 5, and more preferably about 2 to 2.5. Their hydroxyl number values generally fall within a range of about 15 to 750, preferably about 30 to 550, and more preferably about 100 to 550, and their free glycol content generally is from about 0 to 40, preferably from 2 to 30, and more preferably from 2 to 15, weight percent of the total polyester polyol component.

Examples of suitable polyester polyols are those derived from PET scrap and available under the designation Terol 235 from Oxid, Chardol 170, 336A, 560, 570, 571 and 572 from Chardonol and Freol 30-2150 from Freeman Chemical. Examples of suitable DMT derived polyester polyols are Terate 202, 203, 204, 214, 254, 254A and 2541 polyols, which are available from Cape Industries. Phthalic anhydride derived-polyester polyols are commercially available under the designation Pluracol polyol 9118 from BASF Corporation, and Stepanpol PS-2002, PS-2352, PS-2402, PS-2502A, PS-2502, PS-2522, PS-2852, PS-2852E, PS-2552, and PS-3152 from Stepan Company. Especially useful polyester polyols are Terol 235, Stepanpol PS-2352 and Terate 214 and 2541.

The polyols which can be employed in combination with polyester polyols in the preparation of the polyisocyanurate foam compositions of the invention include monomeric polyols and polyether polyols. Suitable polyether polyols are the reaction products of a polyfunctional active hydrogen initiator and a monomeric unit such as ethylene oxide, propylene oxice, butylene oxide and mixtures thereof, preferably propylene oxide, ethylene oxide or mixed propylene oxide and ethylene oxide. The polyfunctional active hydrogen initiator preferably has a functionality of 2–8, and more preferably has a functionality of 3 or greater (e.g., 4–8).

Any suitable hydrogen atom-containing blowing agent can be employed in the foam compositions of the present invention. The flammability of foams made with these agents generally exceeds that of foams made with CFC-11. However, through the use of the catalyst mixture of the invention, polyisocyanurate foams blown with such alternative blowing agents are found to be more fire resistant, when subjected to various testing procedures known and used in the foam art, in comparison to identical foam compositions except for the use of conventional polyisocyanurate foam catalysts and amounts thereof.

The alternative blowing agents employed in the preparation of the inventive polyisocyanurate foams can be selected from a broad range of materials, including partially halogenated hydrocarbons, ethers, and esters, hydrocarbons, esters, ethers, and the like. Among the usable hydrogen-containing halocarbons are the HCFC's such as 1,1-dichloro-1-fluoroethane (HCFC-141b), 1,1-dichloro-2,2,2-trifluoroethane (HCFC-123), monochlorodifluoromethane (HCFC-22), 1-chloro-1,1-difluoroethane (HCFC-142b), 1,1-difluoroethane (HCFC-152a), and 1,1,1,2-tetrafluoroethane (HFC-134a).

A wide variety of co-blowing agent(s) can be employed in conjunction with the hydrogen-containing halocarbons in preparing the foam compositions of the invention. Water, air, nitrogen, carbon dioxide, readily volatile organic substances and/or compounds which decompose to liberate gases (e.g., azo compounds) may be used. Typically, these co-blowing agents are liquids having a boiling point between minus 50° C. and plus 100° C., and preferably between −50° C. and +50° C.

A preferred method for the production of froth foams of the invention is disclosed in U.S. Pat. No. 4,572,865, whose disclosure is hereby incorporated by reference. In this method, the froth-forming blowing agent can be any material which is inert to the reactive ingredients and easily vaporized at atmospheric pressure. This frothing agent advantageously has an atmospheric boiling point of −50° C. to 10° C. In a desirable embodiment of the invention, a higher boiling blowing agent is used in conjunction with the frothing agent. The former blowing agent advantageously has an atmospheric boiling point ranging from about 10° to 80° C.

The blowing agents are employed in an amount sufficient to give the resultant foam the desired bulk density which is generally between 0.5 and 10, preferably between 1 and 5, and most preferably between 1.5 and 2.5, pounds per cubic foot. The blowing agents generally comprise from 1 to 30, and preferably comprise from 5 to 20 weight percent of the composition. When a blowing agent has a boiling point at or below ambient, it is maintained under pressure until mixed with the other components. Alternatively, it can be maintained at subambient temperatures until mixed with the other components.

Any suitable surfactant can be employed in the foams of this invention. Successful results have been obtained with silicone/ethylene oxide/propylene oxide copolymers as surfactants. Examples of surfactants useful in the present invention include, among others, polydimethylsiloxane-polyoxyalkylene block copolymers available from the Union Carbide Corporation under the trade names "Y-10222", "Y-10764", "L-54200" and "L-5340", from the Dow Corning Corporation under the trade names "DC-193" and "DC-5315", and from Goldschmidt Chemical Corporation under the tradenames "B-8408" and "B-8407". It has been found that surfactants such as Y-10764 can contribute significantly to an increase in foam insulation value. Other suitable surfactants are those described in U.S. Pat. Nos. 4,365,024 and 4,529,745 and supplied by Sloss Industries Corporation under the trademarks Foamstab 100 and 200. Generally, the surfactant comprises from about 0.05 to 10, and preferably from 0.1 to 6, weight percent of the foam-forming composition.

Other additives may also be included in the foam formulations. Included are processing aids, viscosity reducers, such as 1-methyl-2-pyrrolidinone, propylene carbonate, nonreactive and reactive flame retardants, such as tris(2-chloroethyl)-phosphate, dispersing agents, plasticizers, mold release agents, antioxidants, compatibility agents, and fillers and pigments (e.g., carbon black). The use of such additives is well known to those skilled in the art.

The present invention also provides a process for producing a laminate which comprises (a) contacting at least one facing sheet with a foam-forming mixture comprising the polyisocyanate, polyester polyol, blowing agent, catalyst mixture, and auxiliaries and additives as required (e.g., a surfactant), and (b) foaming the foam-forming mixture. The process is advantageously conducted in a continuous manner by depositing the foam-forming mixture on a facing sheet being conveyed along a production line, and preferably placing another facing sheet on the deposited mixture. The foam-forming mixture is conveniently thermally cured at a temperature from about 20° C. to 150° C. in a suitable apparatus, such as an oven or heated mold. Both free rise and restrained rise processes, such as disclosed in U.S. Pat. No. 4,572,865, may be employed in the foam production.

Any facing sheet previously employed to produce building panels can be employed in the present invention. Examples of suitable facing sheets include, among others, those of kraft paper, aluminum, glass mats, glass reinforced organic felts, and asphalt impregnated felts, as well as laminates of two or more of the above.

The foam materials of the invention can also be used, with or without a facer(s), for pipe insulation.

The foam materials of the invention can contain various reinforcement materials, such as a quantity of glass fibers, as described in U.S. Pat. Nos. 4,118,533 and 4,284,683, the disclosures of which are hereby incorporated by reference.

It is common practice in the manufacture of the rigid cellular polyisocyanurates to utilize two preformulated components, commonly called the A-component and the B-component. Typically, the A-component contains the isocyanate compound that must be reacted with the polyol of the B-component to form the foam, and the remaining foamforming ingredients are distributed in these two components or in yet another component or components.

One method of utilizing the catalyst mixture in the foam-forming process of the invention can be illustrated with reference to the apparatus shown in the drawing. The apparatus includes tanks 10, 11 and 12 for containing the foamable ingredients and additives such as isocyanate, polyol, filler, surfactant, dye, blowing agent, etc. The tanks are charged with the foam-forming mixture in whatever manner is convenient and preferred for the given mixture. For instance, the foam-forming mixture can be divided into three liquid components, with the polyisocyanate and surfactant in tank 10, the polyol in tank 11, the catalyst mixture in tank 12, and the blowing agent in tank 10 or 11 or divided between these tanks, each tank respectively connected to outlet lines 13, 14 and 15. When water is used as a co-blowing agent, it is conveniently added to tank 11 or introduced into polyol line 14. The temperatures of the ingredients are controlled to ensure satisfactory processing. The lines 13, 14 and 15 form the inlet to metering pumps 16, 17 and 18. The apparatus is also provided with a storage tank (not shown) for a frothing agent. This tank discharges into conduit 19 which opens at "T"-intersection 20 into line 13. A check valve 21 and ball valve 22 in conduit 19 ensure no backup of material toward the frothing agent storage tank. The frothing agent instead can be introduced in the same way into line 14 or both lines 13 and 14. The pumps 16, 17 and 18 discharge respectively through lines 23, 24 and 25. Lines 24 and 25 comprise branches which open into line 26, and lines 23 and 26 are in turn respectively connected to flexible lines 27 and 28. The flexible lines 27 and 28 discharge to mixing head 29. The apparatus is also provided with a roll 30 of lower facing material 31, and a roll 30, of upper facing material 31. Where only a lower facing material is used, the upper facing material can be replaced with a web coated with a release agent. The apparatus is also provided with metering rolls 32 and 33, and an oven 34 provided with vents 35 and 35' for introducing and circulating hot air. The apparatus also includes pull rolls 36 and 37, each of which preferably has a flexible outer sheath 38 and 39, and cutting means 40a for cutting off side excess material and 40b for severing the faced foam plastic produced into finite lengths, thereby producing discrete panels.

As an example of the operation, tank 10 is charged with the organic polyisocyanate admixed with the surfactant, tank 11 is charged with the polyol, and tank 12 is charged with the catalyst composition. The blowing agent may be charged to tank 10 or tank 11, or divided between these tanks. The speeds of the pumps 16, 17 and 18 are adjusted to give the desired ratios of the ingredients contained in the tanks 10, 11 and 12, whereupon these ingredients pass respectively into lines 13, 14 and 15. When used, a frothing agent is injected into line 13 upstream of metering pump 16. The ingredients pass through lines 23, 24 and 25, as well as lines 26, 27 and 28, whereupon they are mixed in the mixing head 29 and deposited therefrom. By virtue of rotation of the pull rolls 36 and 37, the lower facing material is pulled from the roll 30, whereas the upper facing material is pulled from the roll 30'. The facing material passes over idler rollers such as idler rollers 41 and 42 and is directed to the nip between the rotating metering rolls 32 and 33. The mixing head 29 is caused to move back and forth, i.e., out of the plane of the drawing by virtue of its mounting on a reciprocating means 43. In this manner, an even amount of material can be maintained upstream of the nip between the metering rolls 32, 33. The composite structure at this point comprising lower and upper facing material 31 and 31' having therebetween a foamable mixture 44 now passes into the oven 34 and on along the generally horizontally extending conveyor. While in the oven 34, the core expands under the influence of heat added by the hot air from vents 35 and 35' and due to the heat generated in the exothermic reaction between the polyol and isocyanate in the presence of the catalyst. The temperature within the oven is controlled by varying the temperature of the hot air from vents 35, 35' in order to ensure that the temperature within the oven 34 is maintained within the desired limits of 100° F. to 300° F., and preferably 175° F. to 250° F. The foam, under the influence of the heat added to the oven, cures to form faced foam plastic 45. The product 45 then leaves the oven 34, passes between the pull rolls 36 and 37, and is cut by side edge and length cutting means 40a and 40b into finite lengths, thereby forming discrete panels 46 and 46' of the product.

The particular apparatus described above is especially suitable for the manufacture of structural laminates having a thickness equal to or less than 2 inches. When the apparatus makes product within this thickness range, the amount of the catalyst mixture is readily adjustable to provide a suitable foam reactivity profile, e.g., a cream time of 15-20 seconds or less, for the production of structural laminates characterized by a broad range of desirable properties. The production of thicker foam product on this apparatus could result in the incorporation of insufficient catalyst and a product without adequate resistance to shrinkage at cold temperatures. Thicker product could be manufactured if the apparatus were modified to allow for a suitable reactivity profile.

Numerous other modifications to the above-described apparatus will be immediately apparent to those skilled in the art. For example, the tanks 10, 11 and 12 can be provided with refrigeration means in order to maintain the reactants at subambient temperatures. In one modification, a frothing agent is not delivered into lines 13 or 14, but is admixed with the foam-forming ingredient(s) in tanks 10 and/or 11. This approach is especially advantageous for handling large amounts of a highly volatile frothing agent, which can, for example, be apportioned in tanks 10 and 11 which are specially adapted (e.g., pressurized) to hold the frothing agent-containing formulations.

As shown in the drawing, a reinforcing web 47 can be fed into the apparatus. Fiberglass fibers constitute a preferred web material. For example, in a preferred embodiment the reinforcing web will be the type of glass mat used in producing the structural laminate of U.S. Pat. No. 4,028,158, i.e., a thin mat of long, generally straight glass fibers. In accordance with this embodiment, a thin mat 47 of glass fibers is fed from roll 48 toward the nip between the two rotating metering rolls 32 and 33. By virtue of rotation of the pull rolls 36 and 37, reinforcing mat 47 is pulled from its roll, through the nip of the metering rolls and downstream to form part of the resulting structural laminate.

The invention is further illustrated by the following examples in which all parts and percentages are by weight unless otherwise indicated.

EXAMPLE 1

This example illustrates the use of the catalyst mixture of the invention in the synthesis of a polyisocyanurate foam (14% trimer) made form a polyester polyol and an alternative blowing agent.

In the foam synthesis, the following quantities of the following ingredients were combined as indicated:

| Item | Ingredient | Parts by Weight |
| --- | --- | --- |
| A | Polymethylene polyphenyl isocyanate[1] | 202 |
| B | HCFC-141b[2] | 39 |
| C | Silicone surfactant[3] | 2.2 |
| D | Polyester polyol[4] | 98 |

| Item | Ingredient | Parts by Weight |
|---|---|---|
| E | Catalyst[5] | 12.6 |

[1]Item A is a polymethylene polyphenyl isocyanate having an equivalent weight of 138, an acidity of 0.02% HCl, and a viscosity of 2,000 centipoises at 25° C., and is available from Miles Inc. under the trade name MONDUR MR-200.
[2]Item B is that supplied by Elf-Atochem North America.
[3]Item C is that supplied by the Union Carbide Corporation under the trade name Y-10764.
[4]Item D is an aromatic polyester polyol having an equivalent weight of 213 and a viscosity at 25° C. of 15,400 cps., and is supplied by Cape Industries under the trade name Terate 214.
[5]Item E is a mixture employed in the form of a solution in polyethylene glycol (PEG-200) in a 1:1:1:2 weight ratio of potassium octoate (70% in diethylene glycol); 2,4,6-tris[dimethylaminomethyl]phenol: N-hydroxyisopropyl methyl ammonium salt of formic acid: PEG-200-, respectively (supplied by the EléCorporation).

Items A, B and C were introduced into a reaction vessel. Item D was then added to the vessel, and all ingredients were mixed at 3600 rpm for 10 seconds. Item E was then mixed into the contents of the vessel. All ingredients were thereafter mixed at 3600 rpm for an additional 10 seconds and then poured into a box, yielding a polyisocyanurate foam.

The foam produced had the reactivity profile, density and closed cell content shown in the following Table I. When subjected to Char and Hot Plate Tests, the foam was found to undergo the % weight and volume losses recorded in the table and to develop a thick, dense char upon combustion, indicating a high degree of fire resistance.

TABLE I

| FOAM PROPERTIES | |
|---|---|
| Firm/Cream time ratio | 1.85 |
| Density, pcf | 2.03 |
| Closed cells, % | 88.28 |
| Burner Char Test (2" × 2" × 1" foam sample) | |
| % weight loss | 66.34 |
| % volume loss | +8.32 (gain) |
| Hot Plate Test (4" × 4" × 1" foam sample) | 17.82 |
| % weight loss | |

EXAMPLE 2

This example illustrates the use of the catalyst mixture of the invention in the synthesis of another polyisocyanurate foam (14% trimer) made from a polyester polyol and an alternative blowing agent.

The foam synthesis was conducted in the manner described in Example 1, utilizing the following quantities of the following ingredients:

| Item | Ingredient | Parts by Weight |
|---|---|---|
| A | Polymethylene polyphenyl isocyanate[1] | 202 |
| B | HCFC-141b[2] | 40 |
| C | Silicone surfactant[3] | 2.2 |
| D | Polyester polyol[4] | 98 |
| E | Catalyst[5] | 12.6 |

[1]Of Example 1.
[2]Of Example 1.
[3]Of Example 1.
[4]Item D is an aromatic polyester polyol having an equivalent weight of 211 and a viscosity at 25° C. of 8,800 cps., and is supplied by Oxid, Inc. under the trade name Terol 235.
[5]Of Example 1.

The foam had the reactivity profile, density and closed cell content shown in the following Table II. Char and Hot Plate Tests revealed the formation of a dense char upon combustion of the foam and the % weight and volume losses recorded in the table, indicating a high resistance to heat and flame spread.

TABLE II

| FOAM PROPERTIES | |
|---|---|
| Firm/Cream time ratio | 1.64 |
| Density, pcf | 2.00 |
| Closed cells, % | 88.58 |
| Burner Char Test (2" × 2" × 1" foam sample) | |
| % weight loss | 71.08 |
| % volume loss | +1.04 (gain) |
| Hot Plate Test (4" × 4" × 1" foam sample) | 18.76 |
| % weight loss | |

EXAMPLE 3

This example illustrates the production of structural laminates of polyisocyanurate foam (12% trimer) with the use of the catalyst mixture of the invention by reference to the drawing.

The structural laminates were prepared from the ingredients and quantities thereof shown in the following Table III. A free-rise process was employed. For each of the structural laminates, the A-component was charged to tank 10, the B-component to tank 11 and the C-component to tank 12. The laminates A and B utilized aluminum foil/kraft paper/aluminum foil facings.

In both cases, components A, B and C were brought together in a high pressure impingement foam head 29 in the proportions shown in the table. Top and bottom facings were fed toward the nip of metering rolls 32 and 33. The foam forming mixture was deposited onto the lower facing 31 and metered between the nip rolls to establish the final product thickness. The laminates proceeded through oven 34 to yield foam boards A and B.

The properties shown in Table III reveal that polyisocyanurate foam laminates having overall good properties, including superior fire resistance, can be obtained by using the catalyst mixture of the invention even though the foams were blown wholly by the alternative blowing agent HCFC-141b.

TABLE III

| PRODUCTION OF STRUCTURAL LAMINATES | | |
|---|---|---|
| | 12% TRIMER FOAMS | |
| INGREDIENTS | A | B |
| (pts by wt) | | |
| A-Component | | |
| Polymethylene polyphenyl isocyanate[1] | 190 | 189 |
| HCFC-141b[2] | 11 | 16 |
| Silicone surfactant[3] | 2.2 | 2.2 |
| B-Component | | |
| Polyester polyol | 110[4] | 111[5] |
| HCFC-141b[2] | 29.5 | 24.5 |
| C-Component | | |
| Catalyst[6] | 7 | 8 |
| FOAM PROPERTIES | | |
| Firm/Cream time ratio | 1.8 | 2.0 |
| Density, pcf | 1.93 | 1.82 |
| Closed cells, % | 86.20 | 85.34 |
| ASTM E-84 | | |
| Flame spread | 24 | 25 |
| Smoke | 55 | 33 |
| Compressive strength, psi | 23 | 17 |
| k-factor (ASTM C-518) | 0.138 | 0.137 |

TABLE III-continued

PRODUCTION OF STRUCTURAL LAMINATES

| INGREDIENTS | 12% TRIMER FOAMS | |
|---|---|---|
| | A | B |
| 189 days | | . |

[1] Of Example 1.
[2] Of Example 1.
[3] Of Example 1.
[4] Polyester polyol = aromatic polyester polyol having an equivalent weight of 213 and a viscosity at 25° C. of 16,600 cps., and is supplied by Cape Industries under the trade name Terate 214.
[5] Polyester polyol = aromatic polyester polyol having an equivalent weight of 218 and a viscosity at 25° C. of 8,800 cps., and is supplied by Oxid, Inc. under the trade name Terol 235.
[6] Of Example 1.

Example 4

This example illustrates the production of a polyisocyanurate foam roofing product (14% trimer) with the use of the catalyst mixture of the invention.

The roofing product was manufactured from the ingredients and quantities thereof shown in the following Table IV. A restrained rise process was employed. The facers consisted of a glass fiber reinforced organic felt.

During manufacture, the A, B and C components were brought together in a low pressure mechanical foam head and deposited on the bottom facer. The material was fed into an oven by a conveyor and allowed to rise until it was restricted by the upper platen.

The properties shown in Table IV reveal that the polyisocyanurate foam roofing product has good overall properties, including superior fire resistance, when the catalyst mixture of the invention was used even though the foam was blown wholly with HCFC-141b.

TABLE IV

PRODUCTION OF ROOFING PRODUCT (14% TRIMER)

| INGREDIENTS | |
|---|---|
| (pts by wt) | |
| A-Component | |
| Polymethylene polyphenyl isocyanate[1] | 201 |
| HCFC-141b[2] | 24.5 |
| Silicone surfactant[3] | 2.2 |
| B-Component | |
| Polyester polyol[4] | 99 |
| HCFC-141b[2] | 20.5 |
| C-Component | |
| Catalyst[5] | 12.7 |
| FOAM PROPERTIES | |
| Firm/Cream time ratio | 3.0 |
| Density, pcf | 1.98 |
| Compressive strength, psi | 30 |
| k-factor (ASTM C-518) | .170 |
| 194 days | |
| Factory Mutual BUR Calorimeter | PASS at 1.5" |

[1] Of Example 1.
[2] Of Example 1.
[3] Of Example 1.
[4] Of Example 2.
[5] A mixture employed in the form of a solution in polyethylene glycol (PEG-200) in a 2:1:1:1:2 weight ratio of potassium octoate (70% in diethylene glycol): 2,4,6-tris[dimethylaminomethyl] phenol: N,N-Dimethyl-cyclohexylamine: N-hydroxyisopropyl methyl ammonium salt of formic acid: PEG-200, respectively (supplied by the Ele Corporation.

We claim:

1. A process for producing a closed cell, rigid polyisocyanurate foam which comprises bringing together a foam-forming composition comprising (1) a polyisocyanate and (2) a polyester polyol or a mixture of a polyester polyol and at least one other isocyanate-reactive compound int he presence of (a) a hydrogen-containing blowing agent or a mixture of a hydrogen-containing blowing agent and at least one co-blowing agent, and (b) a catalytically effective amount of a catalyst mixture comprising (i) a salt of a carboxylic acid selected from the group consisting of an alkali metal salt and an alkaline earth metal salt and mixtures thereof, (ii) a tertiary amine, and (iii) a quaternary ammonium carboxylate salt, wherein the equivalent ratio of carboxylate metal salt: tertiary amine is a value less than about 2:1, and the total equivalents of quaternary ammonium carboxylate salt are less than the combined equivalents of the carboxylate metal salt and the tertiary amine.

2. The process of claim 1 wherein the blowing agent is selected from the group consisting of 1,1-dichloro-1-fluoroethane, monochlorodifluoromethane, 1-chloro-1,1-difluoroethane, 1,1-difluoroethane, 1,1,1,2-tetrafluoroethane and mixtures thereof.

3. The process of claim 1 wherein the blowing agent is 1,1-dichloro-1-fluoroethane.

4. The process of claim 1 wherein the equivalent ratio of the carboxylate metal salt:tertiary amine is about 1.5-1:1.

5. The process of claim 1 wherein component (i) is an alkali metal salt of a carboxylic acid and component (ii) is a tertiary aminophenol.

6. The process of claim 5 wherein the three catalytic components are contained in a polar hyroxylic organic solvent.

7. The process of claim 1 wherein the three catalytic components are potassium octoate, 2,4,6-tris phenol and the N-hydroxy-isopropyl methyl ammonium salt of formic acid.

8. The process of claim 7 wherein the equivalent ratio of potassium octoate:2,4,6-tris[dimethylaminomethyl] phenol is about 1:1.

9. The process of claim 8 wherein the three catalytic components are contained in a solvent selected from the group consisting of an alkylene diol, a polyalkylene ether diol and mixtures thereof.

10. The process of claim 1 wherein the polyester polyol is an aromatic polyester polyol.

11. The process of claim 10 wherein the aromatic polyester polyol is the reaction product of a polycarboxylic acid component and an aliphatic diol of the formula:

HO—R—OH wherein R is a divalent radical selected from the group consisting of:
 (a) alkylene radicals each containing from 2 through 6 carbon atoms, and
 (b) radicals of the formula:

—(R$^1$O)$_m$—R$^1$— wherein R$^1$ is an alkylene radical containing from 2 through 6 carbon atoms, and m is an integer of from 1 through 4, and
 (c) mixtures thereof.

12. The process of claim 11 wherein the acid component of the aromatic polyester polyol is selected from the group consisting of (a) ester-containing by-products from the manufacture of dimethyl terephthalate, (b) scrap polyalkylene terephthalates, (c) phthalic anhydride, (d) residues from the manufacture of phthalic acid or phthalic anhydride, (e) terephthalic acid, (f)

residues from the manufacture of terephthalic acid, (g) isophthalic acid and (h) trimellitic anhydride, and (i) combinations thereof.

13. The process of claim 10 wherein component (i) is an alkali metal salt of a carboxylic acid and component (ii) is a tertiary aminophenol.

14. The process of claim 13 wherein the equivalent ratio of the carboxylate alkali metal salt:tertiary aminophenol is about 1.5–1:1.

15. The process of claim 14 wherein the blowing agent is selected from the group consisting of 1,1-dichloro-1-fluoroethane, monochlorodifluoromethane, 1-chloro-1,1-difluoroethane, 1,1-difluoroethane, 1,1,1,2-tetrafluoroethane and mixtures thereof.

16. The process of claim 15 wherein the blowing agent is 1,1-dichloro-1-fluoroethane.

17. The process of claim 16 wherein the equivalent ratio of the carboxylate alkali metal salt:tertiary aminophenol is about 1:1.

18. The process of claim 17 wherein the three catalytic components are potassium octoate, 2,4,6-tris[dimethylaminomethyl] phenol and the N-hydroxy-isopropyl methyl ammonium salt of formic acid, and the catalytic components are contained in a solvent selected from the group consisting of an alkylene diol, a polyalkylene ether diol and mixtures thereof.

19. The process of claim 18 wherein the acid component of the aromatic polyester polyol is selected from the group consisting of (a) ester-containing by-products from the manufacture of dimethyl terephthalate, (b) scrap polyalkylene terephthalates, and (c) combinations thereof.

20. A process for producing a laminate comprising (a) contacting at least one facing sheet with the foam-forming composition of claim 1, and thereafter foaming and curing the foam-forming composition.

21. The process of claim 6 wherein the quaternary substituents of the quaternary ammonium carboxylate salt are independently selected from the group consisting of lower-alkyl, hydroxy-lower-alkyl, halo-lower-alkyl, and aralkyl.

22. The process of claim 21 wherein the equivalent ratio of the carboxylate alkali metal salt:tertiary aminophenol is about 1.5–1:1.

23. The process of claim 22 wherein the three catalytic components are contained in a solvent selected from the group consisting of an alkylene diol, a polyalkylene ether diol and mixtures thereof.

* * * * *